United States Patent Office 3,353,028
Patented Nov. 14, 1967

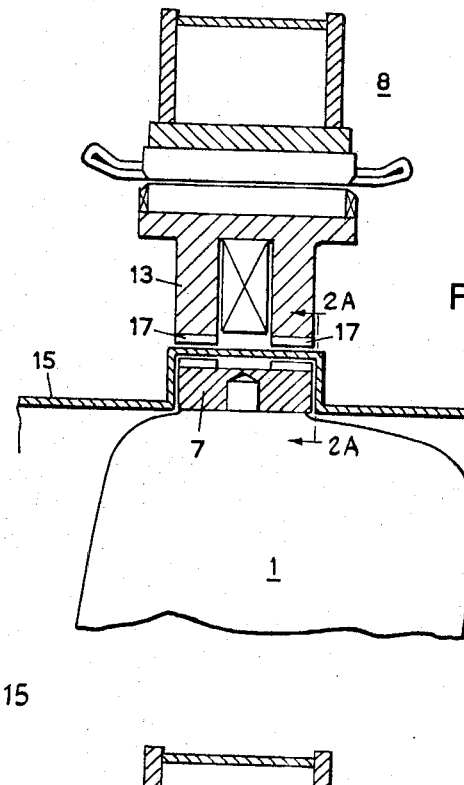
FIG.2
FIG.2A
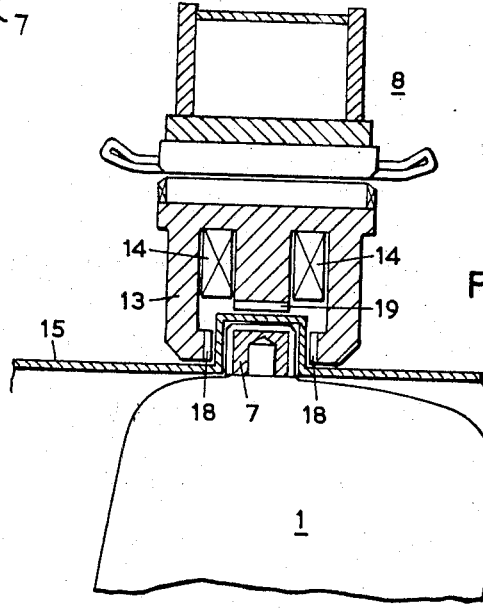
FIG.3

3,353,028
TURBOGENERATORS, INCLUDING A MAGNETIC COUPLING BETWEEN THE DYNAMO ROTOR AND THE TURBINE RUNNER
Michael Braikevitch and Edward Thomas Metcalf, Netherton, England, assignors to The English Electric Company Limited, London, England, a British company
Filed Nov. 2, 1964, Ser. No. 408,266
Claims priority, application Great Britain, Nov. 6, 1963, 43,777/63
19 Claims. (Cl. 290—52)

This invention relates to water turbines and pumps, and reversible pump/turbines.

The present invention consists in a water turbine or pump or reversible pump/turbine apparatus, comprising a bladed runner mounted in a water flow tube, an electric machine forming a generator in the case of a turbine, a motor in the case of a pump, or a generator/motor in the case of a reversible pump/turbine, said machine having a rotor coupled to the runner, and a stator, and a non-magnetic wall interposed between the stator and runner and sealing said stator from water in the flow path through the tube.

In order that the invention can be fully understood three embodiments thereof will now be described, by way of example, with reference to the accompanying drawings, in which:

FIGURE 2 illustrates a portion of the upper part of the turbine shown in FIGURE 1 but in which the ring castellations and rotor windings are disposed in a different manner from that shown in the latter figure;

FIGURE 2A is a scrap section on the line B—B of FIGURE 2;

FIGURE 3 illustrates a portion of the upper part of the turbine shown in FIGURE 1, but in which the ring castellations and the rotor windings are disposed in a different manner from that shown in either of the preceding figures;

Figures 1, 1A:
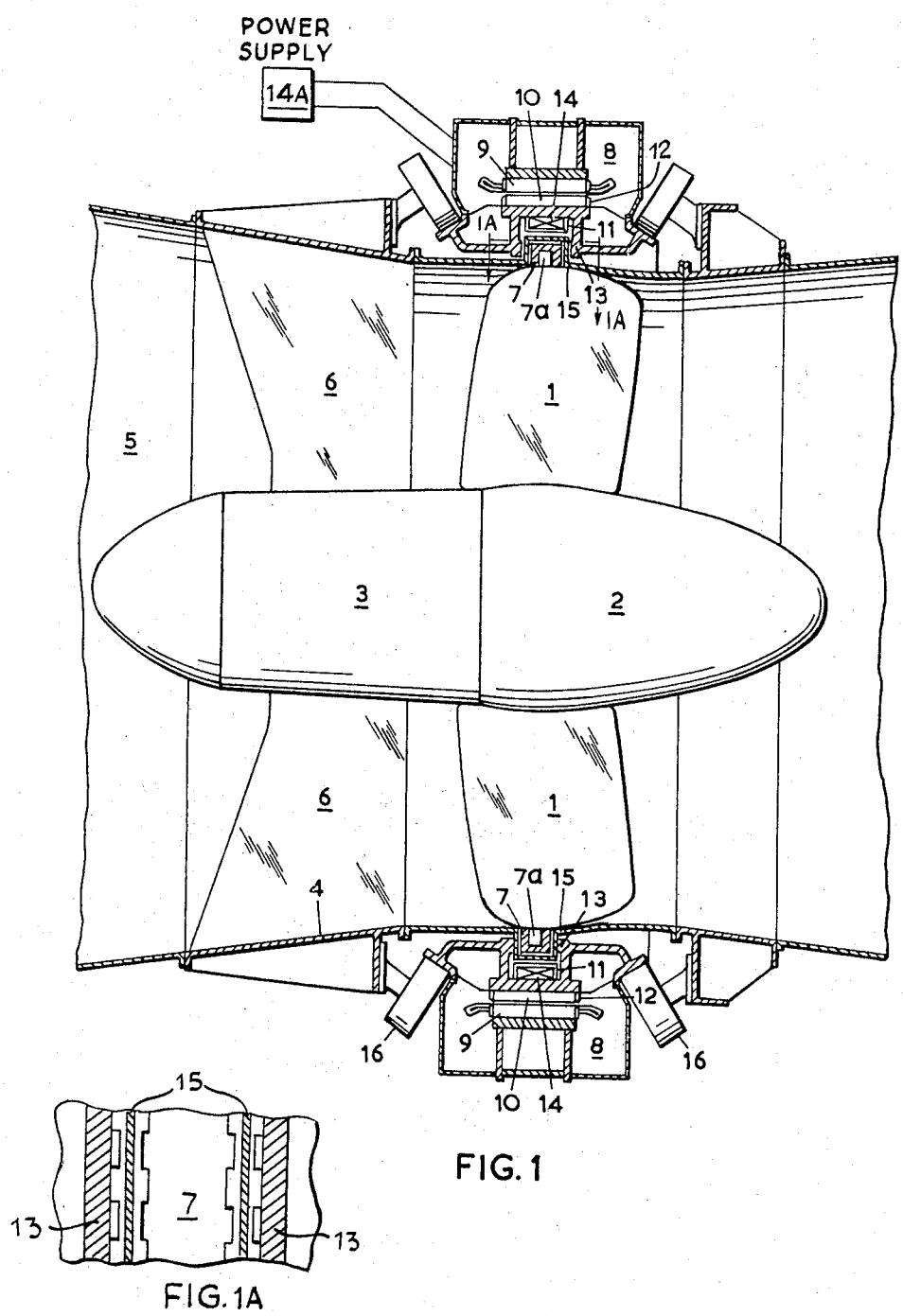
FIGURE 1 illustrates in detail a cross-section through one form of water turbine according to this invention, mounted horizontally.
FIGURE 1A is a scrap section on the line A—A of FIGURE 1.
Figure 4:
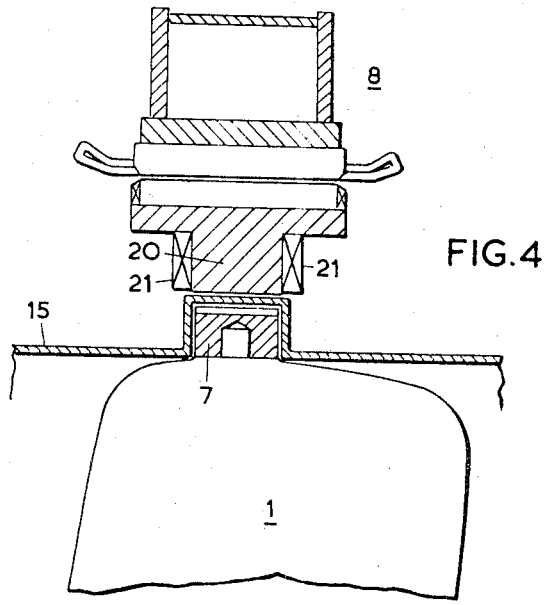
Figure 5:
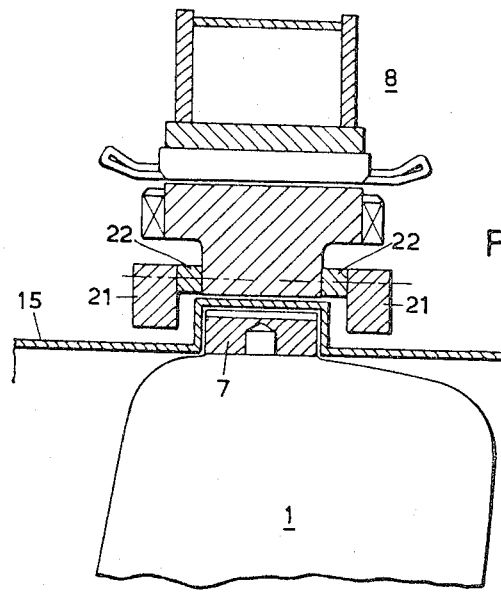
Figure 6:
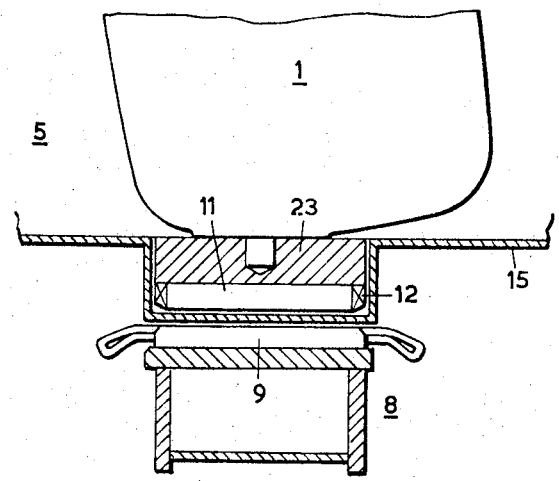
Figure 7:
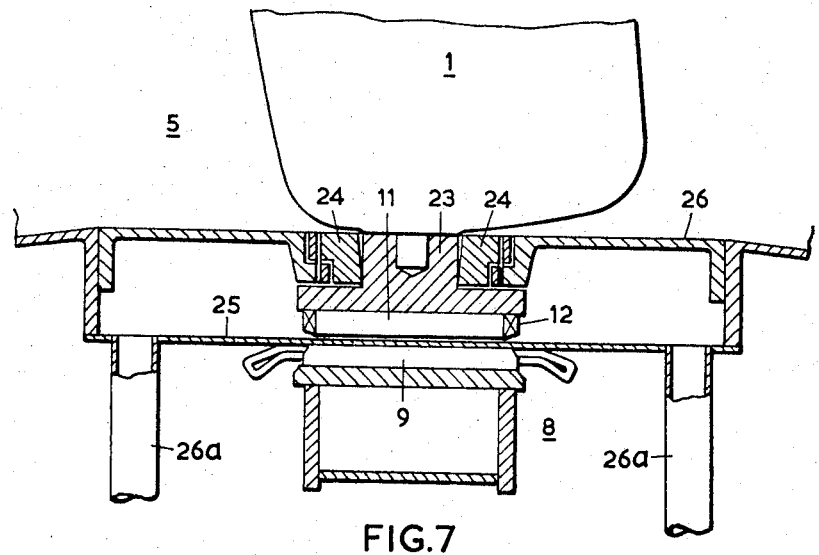
Figure 8:
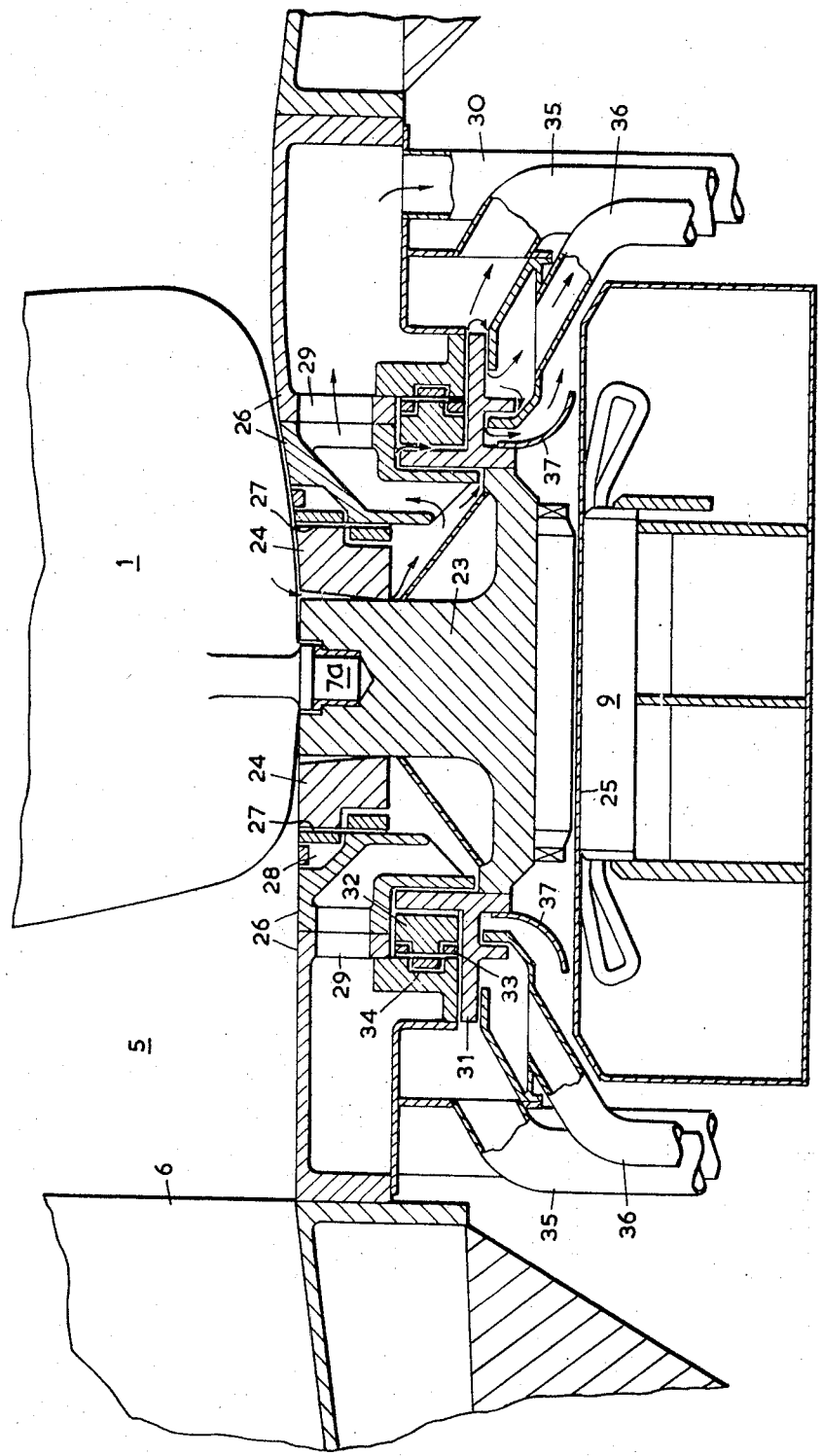

FIGURES 4 and 5 each illustrate a portion of the upper part of the turbine shown in FIGURE 1, but in which the rotor assembly in these figures are different both from each other and those shown in FIGURES 1 to 3;

FIGURE 6 illustrates diagrammatically a cross-section through the lower part of another form of turbine according to this invention;

FIGURE 7 illustrates diagrammatically a cross-section through the lower part of another form of turbine according to this invention including water seals; and FIGURE 8 illustrates in more detail a modification of the turbine shown in FIGURE 7 in which further water seals are provided.

Throughout the drawings similar parts have been indicated by the same reference numerals.

The turbines shown in FIGURES 1 to 5 deal with the manner in which a connection may be made between the runner of a water turbine and an electrical generator located around the runner, the generator being driven by the runner without resort to shafting. In these figures the driving torque of the runner is transmitted magnetically to the generator rotor.

Referring now to FIGURE 1, there is shown a horizontally mounted water turbine including runner blades 1 mounted on a support 2 and rotatable about the axis of a fixed casing 3 secured to the walls 4 of a cylindrical water passage 5 by vanes 6. A radially castellated ring 7 of magnetic material is secured to the outer periphery of the blades 1, the blades 1 being pivotally movable with respect to the ring, about a pin 7a and the blade support 2, to alter their pitch relative to the axial flow of water through the passage 5.

The portion of the passage 5 in which the blades 1 and the ring 7 rotate is defined by a stationary nonmagnetic wall 15 which has outwardly directed portions connected by a further portion parallel to the axis of the passage 5 whereby to define a circumferential channel communicating with the passage 5; the magnetic ring 7 rotates within the circumferential channel so formed.

Disposed on the outside of the fixed non-magnetic wall 15 is an electrical generator 8 comprising a stator 9 and a rotor 10. The rotor 10 is supported on bearings 16, which are mounted on the casing 4, so as to be rotatable about the same axis as the runner blades 1, and comprises a plurality of poles 11, a field winding 12, and a channelled ring 13 of ferro-magnetic material; the ring 13 is provided with castellations, corresponding in number to those on the ring 7, which extend towards the outwardly directed portions of the non-magnetic wall 15 and thus extend towards the castellations on the ring. In addition, the rotor 10 has a further winding 14 which is energisable by means of a supply 14A.

When the winding 14 is energised, the ring 13 becomes magnetized and the magnetic flux produced, which passes through the non-magnetic wall 15, magnetically couples the rotor 10 to the magnetic ring 7 on the blades 1. Thus a flow of water through the passage 5 rotates the runner blades 1, the rotational torque of which will be transferred to the rotor 10 and cause current to be produced in the stator 9.

Those of the roller bearings 16 which are disposed about an arc extending over the lower portion of the casing 4 support the rotor 10; the remaining roller bearings 16 serving merely as guides. Alternatively, the rotor 10 may rotate in a complete annular roller bearing or in Michell-type pad bearings or in a combination of both.

FIGURE 2 shows an alternative arrangement in which the castellations are disposed on the periphery of the ring 7 and the peripheral faces of the ring 13, the ring faces 17 being disposed radially opposite the ring 7.

FIGURE 3 shows an alternative arrangement in which the castellations are effectively disposed in a manner comprising a combination of both FIGURE 1 and FIGURE 2; that is, the ring 13 is substantially an E-shaped annular ring having radial castellations provided on opposite inwardly directed faces 18 and axially extending castellations provided on a central peripheral face 19. In turn, the ring 7 is provided with correspondingly located castellations on both its axial and radial faces. Further, two coils 14 are provided in this embodiment and the arrangement could be such that the faces 19 lie on a plurality of separate pole protrusions corresponding in number to the castellations or a plurality of castellations may be formed on each (segmental) protrusion.

FIGURE 4 shows an alternative arrangement in which the rotor has a plurality of separate salient poles 20 around which windings 21 are disposed, castellations being formed on only the outer periphery of the ring 7. Alternatively, as mentioned above, each pole may have a plurality of radially-extending castellations formed thereon.

FIGURE 5 shows an arrangement which employs the field poles of the generator instead of separate poles to lock together the runner blades and the rotor, the rotor "rim" being omitted on the inner side of the field poles. The field poles are joined together by two rings 21 disposed as opposite sides of the poles and connected thereto by non-magnetic insertions 22, the whole being clamped together.

In each of the above arrangements permanent magnets may be employed instead of castellations being formed.

As a further alternative, the driving torque of the runner could be transmitted by using the ring 7 as the rotor of an induction generator, the ring being either plain or having a winding built-in, e.g. in the form of a squirrel cage, any of the previously described pole arrangements being applicable.

In each of these embodiments it can be seen that the ring 7 substantially wholly fills an annular recess in the non-magnetic casing 15 so as to reduce any drag caused by the movement of the castellations on this ring through the water.

One advantage of the above described embodiments is that the electrical supply to the winding 14 can be tripped so as to prevent the rotor from being rotated in the event of the runner blades rotating at a speed in excess of a predetermined value.

The turbines shown in FIGURES 6 to 8 deal with the manner in which a generator is located around a water turbine, the generator rotor being mounted on the runner.

Referring now to FIGURE 6 there is diagrammatically shown the lower half of a symmetrical water turbine in which a rotor ring 23 is secured to the periphery of the runner blades 1, and rotates in the water.

In this case there are no exposed castellations provided on the rotor ring and the poles 11 and the field winding 12, together with the connections thereto, not shown, are encapsulated by a non-magnetic water-proofing compound so as to present a smooth external surface and permit the rotor to run submerged in the water in the passage 5. The non-magnetic casing 15 separates the rotor 23 from the stator 9 in this embodiment.

The rotor is suitable for use in a synchronous generator, or in an induction generator.

In this embodiment however, the rotation of the rotor in water leads to some loss in efficiency due to friction and, if there is sand or other abrasive particles in the water, this could cause wear.

In FIGURE 7 there is shown an arrangement in which resiliently mounted water seals 24 are provided so that only a limited amount of water will contact the rotor, the rotor thus rotating mostly in air, but in which any failure of the seal will not prevent operation. In this embodiment a ring 25 of non-magnetic material separates the rotor and stator, this ring together with an inner casing 26 together delimiting an annular cavity in which the rotor 23 rotates. Water drainways 26a extend from this cavity to a sump (not shown).

Referring now to FIGURE 8, the blades are pivotally mounted for pitch-variation in the manner shown in FIGURE 1. The rotor 23 comprises a ring against which bear two annular water seals 24 which are resiliently mounted by spring members 27 one end of which is secured to the casing 26. An annular pressure chamber 28 is thus formed between the casing 26 and the seals and is in communication with the water passage 5. The water in the chamber 28 tends to bring the seals 24 into contact with the sides of the rotor ring but this force is balanced by the residual pressure exerted by the water passing through the gaps between this ring and the seals. Thus, the seals effectively float closely to, but do not touch, the ring under normal operating conditions thereby minimising friction and wear.

The casing 26 has a plurality of radially-spaced bores 29 extending therethrough which communicate with drainage pipes 30 which extend around an arc on the lower part of the turbine to drain away at least a major portion of the water leaking past the seals.

The ring of the rotor is outwardly flared and has two annular members 31 respectively secured to the outer edges of the flaring. Two further annular water seals 32, resiliently mounted on the casing 26 by spring members 33 secured at opposite ends to this casing, bear against these annular members 31 providing a further seal against ingress of water into the vicinity of the stator 9. An annular pressure chamber 34 is formed between the rear of these spring members and the casing 26.

Thus, any leakage water not being drained away will pass between the members 31 and the casing 26 and thence through gaps between the casing and the seals 32, after which at least a major portion thereof is drained away through drainage pipes 35 similar to the pipes 30.

Finally, should any water pass around the outer edge of the members 31 then this will be drained away through further drainage pipes 36 and, as a further safeguard arcuate throwers 37 are secured to the members 31 to direct any residual water away from the stator.

The seal 32 executes two functions, firstly, it operates as a second seal when the turbine is running and secondly it is used as an isolating seal when the turbine is stationary. To this end, the pressure chamber 34 is supplied with high pressure from an external source, not shown, when it is desired to bring the seals 32 into contact with the inner face of the member 31 and form a positive fluid-tight seal when the turbine is stationary, and when the turbine is running the pressure is relieved so that the seals 32 effectively "float" in a similar manner to that of the seals 24.

It will be appreciated that many modifications could be effected to the arrangements described above. For example, the rotor ring could comprise a plurality of abutting segments instead of being a continuous annular body and the supporting vanes could be replaced or supplemented by stays. The vanes could furthermore be pivotally mounted for pitch variation.

Turbines in accordance with this invention are particularly applicable in deriving energy from low heads of water, e.g. from the tidal flow of water, since the runner blades rotate at a fairly slow speed. For example, a number of these turbines can be housed in tunnels bored through a dam extending across a tidal river or channel.

Although the operation of the above arrangements has been described in relation to turbine generators the arrangement could operate as a reversible pump/turbine or even as a pure pump. In the case of a reversible pump/turbine the water may flow in one direction to drive the runner and generate electricity in the electrical machine, or the electrical machine may operate as a motor and drive the runner to pump water in the other direction. By varying the pitch of the runner blades it may be possible for the runner to rotate in one direction for both modes of operation.

We claim:
1. A water turbine comprising
   a water flow tube,
   a bladed runner rotatably mounted in said water flow tube,
   a magnetic ring mounted on, and extending around, the outer periphery of the bladed runner,
   an electric generator having
   a rotor,
   a stator, and
   means for magnetically coupling the rotor to said ring, and
   a non-magnetic wall forming a portion of the wall of the water flow tube interposed between the rotor and the ring and sealing the stator from water in the water flow tube.

2. A water turbine according to claim 1 wherein a portion of said water flow tube is outwardly stepped to form an annular recess, said non-magnetic wall defining the base of said recess, and wherein said magnetic ring is disposed within said recess.

3. An energy converter operable as one of the following, namely, a water turbine, a water pump and a reversible pump/turbine, comprising
   a water flow tube of circular cross-section having a cylindrical wall section which is outwardly stepped from the adjacent wall sections of the tube to form an annular recess in the wall of the tube, said cylindrical wall section being made of non-magnetic material, a bladed runner, means mounting said bladed runner for rotation within said water flow tube, a castellated magnetic ring secured to, and extending around, the outer periphery of the bladed runner, said ring being located in said recess, an electrical machine surrounding the water flow tube and having a castellated rotor adjacent the said ring, a stator surrounding the rotor, and means for magnetically locking together the rotor and the ring.

4. An energy converter according to claim 3, wherein said ring and said rotor have castellations extending in a radial direction.

5. An energy converter according to claim 3, wherein said ring and said rotor have castellations extending in an axial direction.

6. A water turbine or pump comprising a water flow tube, a bladed runner mounted for rotation in said water flow tube, a magnetic ring mounted on, and extending around, the outer periphery of the bladed runner, an electrical machine having a rotor and a stator, said rotor having a pair of ring members, a plurality of circumferentially spaced magnetic members forming the poles of said rotor clamped between said ring members, and means for magnetically locking together the rotor poles and the said magnetic ring on the bladed runner, and a non-magnetic wall interposed between the rotor and the magnetic ring whereby the stator is sealed from water in the water flow tube.

7. A reversible pump/turbine comprising a water flow tube of substantially circular cross-section, said tube having an outwardly stepped portion of non-magnetic material forming an annular recess therein, a runner, a plurality of radial blades in said runner, means mounting said runner for rotation within said water flow tube, a ring of magnetic material surrounding said runner blades and located in said recess, said blades being pivotally connected to said ring whereby the pitch angle of the blades may be varied, an electrical machine having a rotor surrounding said recess, a stator surrounding said rotor, and means for magnetically locking together the rotor and the said ring on the runner blades.

8. An energy converter operable as one of the following, namely, a water turbine, a water pump and a reversible pump/turbine, comprising a water flow tube having outwardly directed flanges defining therebetween an annular channel in a plane perpendicular to the axis of said tube, a bladed runner mounted coaxially in said water flow tube, an electrical machine having a ring-shaped rotor mounted on the outer periphery of the bladed runner and disposed within said channel, and a stator, said rotor having cylindrical flange portions and rotor pole windings mounted adjacent said flange portions, first dynamic water seals resiliently secured to the flanges and in engagement with said rotor between the pole windings thereof and said bladed runner, and second dynamic water seals resiliently secured to the said tube and in engagement with the flange portions of said rotor.

9. An energy converter according to claim 13 wherein each said first seal and the adjacent water tube flange define therebetween a cavity which is open to receive water from within said tube and thereby to apply the pressure of water to said seal in opposition to the pressure of water tending to flow in a leakage flow path between the seal and the rotor and wherein each said second seal and an adjacent wall of the water tube define therebetween a cavity which is open to receive water from the first mentioned leakage flow path and thereby to apply the pressure of said water to said second seal in opposition to the pressure of water tending to flow in a second leakage flow path between said second seal and the rotor.

10. A water turbine comprising a water flow tube of substantially circular cross-section having outwardly directed flanges defining therebetween an annular channel, a bladed runner mounted coaxially in said water flow tube, a housing surrounding said water flow tube, an electric generator disposed in said housing and having a rotor comprising a ring of magnetic material mounted around the outer periphery of the bladed runner and disposed within said channel, and a stator, said ring having an inner portion and a flanged outer portion, first resilient water seals disposed in said annular channel and located between, and in engagement with, the flanges of said water tube and the said inner portion of the ring, second resilient water seals located between, and in engagement with, said housing and the flanged outer portions of said ring, and a non-magnetic wall interposed between the rotor and the stator.

11. A water turbine according to claim 10, comprising means mounting the runner blades in said ring of magnetic material for pivotal movement to vary the pitch angle of the blades.

12. An energy converter, comprising wall means defining a water passage, a dynamo electric machine comprising a stator mounted externally of and surrounding said water passage, and a rotor, a bladed runner mounted in said water passage and rotatable therein about an axis therealong, means mounting the said rotor on said bladed runner to rotate therewith, and wall portions extending outwardly from said wall means in a direction transverse to said axis, and a further wall portion extending substantially parallel to the said axis, all the said wall portions being made of non-magnetic material and defining together an annular channel around and communicating with said water passage, said rotor being positioned to rotate within and substantially wholly filling said annular channel.

13. An energy converter according to claim 12, in which the said bladed runner includes a plurality of radially extending pitch-adjustable blades, said rotor being mounted on the tips of the blades.

14. An energy converter according to claim 12, in which the rotor is encapsulated in a non-magnetic waterproofing compound.

15. An energy converter, comprising wall means defining a water passage, a dynamo electric machine comprising a stator and a rotor both mounted externally of and surrounding said water passage, a runner mounted for rotation within said water passage, and means magnetically coupling the runner and the rotor for rotation together.

16. An energy converter according to claim 15 in which the said wall means includes a non-magnetic section stepped to provide an annular channel communicating with said water passage, said means magnetically coupling the runner and the rotor together comprising a ring of magnetic material fixed on and rotating with said bladed runner, said ring being positioned in and substantially wholly filling the annular channel, and magnetic flux generating means producing magnetic flux linking with said rotor and said ring.

17. An energy converter according to claim 15, in which the means magnetically coupling the runner and the rotor for rotation together comprises a ring of magnetic material fixed on and rotating with the runner adjacent the wall means, coil means on the rotor, and means operative to energise the coil means whereby to produce a magnetic flux extending through the wall means to magnetically lock the bladed runner and the said ring for rotation together.

18. An energy converter comprising wall means defining a longitudinal water passage having an annular chamber therearound, a dynamo electric machine comprising a stator mounted externally of and around said wall means, and a waterproofed rotor, a bladed runner mounted in said water passage so as to be rotatable about an axis therealong, means mounting the said rotor on the bladed runner so that the rotor is positioned within the annular chamber and rotates with the bladed runner, dynamic sealing means mounted on said wall means and allowing only a small amount of water to enter said annular chamber from said water passage, and draining means connected to said annular chamber for removing therefrom water passing the dynamic sealing means.

19. An energy converter according to claim 18, in which the dynamic sealing means includes a sealing ring flexibly mounted on the said wall means and acting between the wall means and a portion of said rotor.

References Cited

UNITED STATES PATENTS

| | | | |
|---|---|---|---|
| 2,436,683 | 2/1948 | Wood | 290—52 |
| 2,782,321 | 2/1957 | Fischer | 290—52 X |
| 2,814,254 | 11/1957 | Litzenberg | 310—86 X |
| 3,231,768 | 1/1966 | Dannenmann | 310—86 |

FOREIGN PATENTS

| | | |
|---|---|---|
| 710,021 | 9/1941 | Germany. |
| 718,423 | 3/1942 | Germany. |

ORIS L. RADER, *Primary Examiner.*

G. R. SIMMONS, *Assistant Examiner.*